Figure 1:
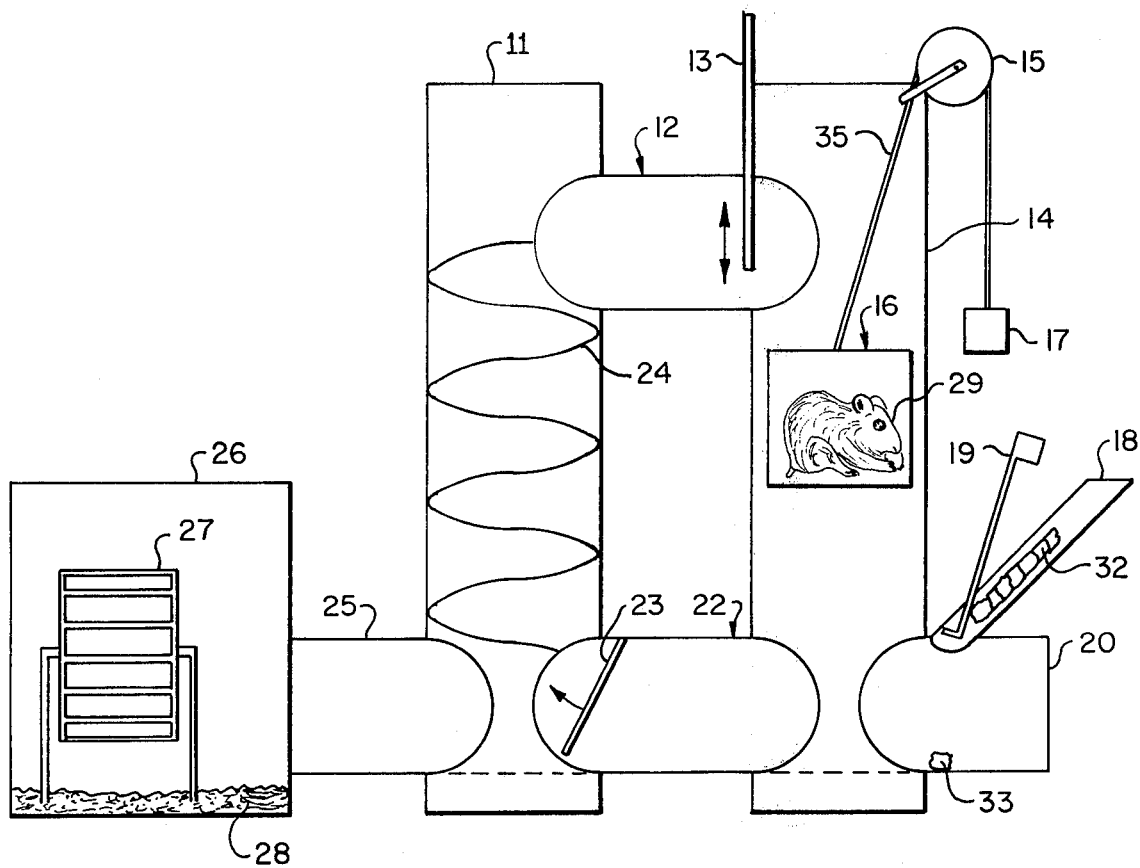

United States Patent [19]

DeSousa

[11] 4,027,626

[45] June 7, 1977

[54] PET ELEVATOR

[76] Inventor: Peter DeSousa, 183 School St., Stoughton, Mass. 02072

[22] Filed: June 12, 1975

[21] Appl. No.: 582,821

[52] U.S. Cl. .................................... 119/15; 119/1
[51] Int. Cl.² ........................................ A01K 1/00
[58] Field of Search ................ 119/15, 18, 50, 54, 119/55, 29, 1; 214/99; 187/1 R, 15, 42, 44, 45, 36, 94

[56] References Cited

UNITED STATES PATENTS

| | | | |
|---|---|---|---|
| 2,515,063 | 7/1950 | Stanchfield | 119/50 |
| 3,416,498 | 12/1968 | Stahl, Sr. | 119/55 |
| 3,742,908 | 7/1973 | Merino | 119/1 |

*Primary Examiner*—Louis G. Mancene
*Assistant Examiner*—Peter K. Skiff

[57] ABSTRACT

A device used in connection with the keeping of pets. A pet such as a hamster is confined to an area and must ascend one tube to descend in an elevator which triggers a feeding mechanism, and so arranged that he can take but one direction to complete a cycle which causes him to operate the mechanism in response to his need for food.

1 Claim, 2 Drawing Figures

PET ELEVATOR

Hamsters and the like are kept as pets similar to other types of animals particularly members of the rodent family. The keeping of hamsters has become quite sophisticated in recent times. In order to enjoy the benefits of the animal as a pet, it is desirable to have things that the pet can do which entertain and amuse not only the hamster, but its owners.

Conditioning animals to follow certain routines is quite enjoyable. With the present invention, the household pet is compelled to go through certain routines and operate certain mechanisms in order to gain food. This forced training compels the animal to develop all of its ingenuity and skill.

The present invention involves considerable outside apparatus which the hamster is able to manipulate in order to achieve the desired goal of receiving food. The animal learns this very quickly. The necessary steps required of the animal are so involved that he puts on quite a show for the owner.

The inventor, therefore, has discovered in the assembly of certain selected parts he can provide a device which a hamster can manipulate so effectively and have the parts so arranged and disposed that quite an entertaining show can be performed by the animal in its natural pursuit of a food, and in the development of his understanding of his environment, and the requirements to obtain his goal.

Therefore an object of the present invention is to provide a device for training animals.

Another object of the present invention is to provide an entertaining attachment to a conventional household animal's cage.

Another object of the present invention is to provide a device operable by household pet, which entertains the owner.

Another object of the present invention is to provide an elevator device operable by the hamster in his pursuit of natural habits in getting food.

Figure 2:
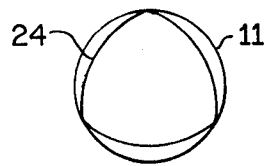

Other objects, features and advantages of the present invention will be better understood from the following detailed description, especially when read in conjunction with the attached drawings of which:

FIG. 1 is a direct view of the present invention.
FIG. 2 is a detailed view of climbing tube 11.

Referring to FIG. 1, we see hamster cage 26, with continuous run device 27 commonly found in hamster cages. Along floor 28 is sawdust used to cover the floor of the cage. Attached to the cage 26 is a tube 25 which leads to vertical tubes 11 and 14, and a second tube 22 which connects parallel tubes 11 and 14.

Connecting vertical tubes 11 and 14 is also tube 12. Affixed to tube 14 at the bottom and a continuation of connecting tube 22 is an extention tube 20. Attached to tube 20 is feed tube 18 containing pellets of food 32. Trip lever 19 when triggered permits one pellet of the food 32, to drop into tube 20, and is shown as pellet 33 resting at the bottom of tube 20.

In order to prevent the animal from going in any but the desired directions gates 23 is installed in tube 22. This permits the animal to come out of tube 22, when he leaves the elevator but not enter it.

In tube 12 is a safety elevator, gate 13, which is lifted by the elevator in returning to the unloaded condition and lowered when the elevator descends thereby preventing an animal from entering the empty tube, and thereby get stuck therein, frustrating the purpose of the device. Elevator tube 14 has an elevator 29 with a pulley 15 and connecting cable 35 to counterweight 17. When a hamster 29 is in the elevator 16, the additional weight causes the elevator to descend from in front of tube 12 down to tube 22, where the food pellet 33 can be recovered by the hamster. He leaves by way of door 23. The animal's weight once removed permits the animal to enter once agsin.

Referring now to FIG. 1 and FIG. 2 with regard to tube 11. Tube 11 as seen in both views has a cable 24, that is interlaced within the tubes. The hamster can climb up this, as one would a ladder to gain access to connecting tube 12. Therefore, the animal once he gets into this tube cannot go by way of tube 22, because of door 23, climbs up the ladder 24 to tube 12, over to elevator tube 14, gets into the elevator 16, and then descends down to tube 20 as stated before.

When the counterweight 17 moves it triggers lever 19, causing a food pellet to be deposited in end tube 20.

It can be seen then, that the hamster leaves tube 25, climbs up to connecting tube 12, enters into the elevator, descends down, causing the food pellets to be deposited in the tube. He takes that food pellet and by way of gate 23 returns to his cage hiding his food in the sawdust 23, for later consumption if he does not eat it at that moment. This process is repeated over and over again entertaining the observer as well as feeding the animal.

Although I have described my invention with respect to specific apparatus, I do not wish to be limited thereby. I only wish to be limited by the appended claims.

I claim:
1. A pet elevator device comprising in combination with a cage,
   horizontal tube means for connecting to an animal cage,
   vertical tube means interconnecting said horizontal tube means whereby a pet can leave said animal cage and climb from one horizontal tube to a higher horizontal tube
   a second vertical tube containing an elevator (tube) parallel to said first vertical tube interconnecting said horizontal tubes,
   said elevator responsive to the entrance of a pet whereby the pet is brought from the higher level horizontal tube to the lower level horizontal tube
   said elevator counterbalanced to return to said higher level in response to the exit of a pet,
   a food receiving tube accessible when said elevator is in a lower mode extending said lower level horizontal tube,
   a food dispenser affixed said food receiving tube responsive to the movement of said elevator wherein a preselected quantity of food is deposited in said food receiving tube with each operation of the elevator encouraging the operation of the elevator by the pet,
   gate means in said lower horizontal tube interposed between said interconnected vertical tubes which forces the animal to ascend said first verticle tube to gain access to the elevator.

* * * * *